(12) United States Patent
Baumuller et al.

(10) Patent No.: US 7,918,755 B2
(45) Date of Patent: Apr. 5, 2011

(54) ECCENTRIC TENSIONING DEVICE

(75) Inventors: Rainer Baumuller, Herzogenaurach (DE); Roland Arneth, Eggolsheim (DE); Niels Flamig, Hessdorf (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 12/754,224

(22) Filed: Apr. 5, 2010

(65) Prior Publication Data

US 2010/0190595 A1 Jul. 29, 2010

Related U.S. Application Data

(62) Division of application No. 11/776,638, filed on Jul. 12, 2007, now abandoned.

(30) Foreign Application Priority Data

Dec. 21, 2006 (DE) .......................... 10 2006 061 793

(51) Int. Cl.
*F16H 7/12* (2006.01)
(52) U.S. Cl. .......................... 474/135; 474/112; 474/133
(58) Field of Classification Search .................. 474/112, 474/133, 135
See application file for complete search history.

(56) References Cited

U.S. PATENT DOCUMENTS

| 5,266,067 A | 11/1993 | Gapco |
| 6,165,091 A | 12/2000 | Dinca et al. |
| 2006/0068957 A1 | 3/2006 | Stone et al. |

FOREIGN PATENT DOCUMENTS

DE 4033777 4/1992

*Primary Examiner* — Robert A Siconolfi
*Assistant Examiner* — Anna Momper
(74) *Attorney, Agent, or Firm* — Volpe and Koenig, PC

(57) ABSTRACT

An eccentric tensioning device for tensioning a traction means is provided. The eccentric tensioning device includes a track roller device having a running disk and a rolling bearing, a work eccentric for supporting the track roller device, the work eccentric being supported on an adjustment eccentric, a single torsion spring for pretensioning the work eccentric, and a fixing device for securing the work eccentric in a mounting position in which the torsion spring is located in a pretensioned state. The fixing device is positionable on a flange surface upon which the eccentric tensioning device is mountable during attachment, in which the running disk is forced radially relative to the rotating axis of the rolling bearing against the associated traction means under effect of the work eccentric, and a free switching path is traversed through an axial play being overcome against an axial force applied solely by the torsion spring.

13 Claims, 13 Drawing Sheets

ECCENTRIC TENSIONING DEVICE

CROSS REFERENCE TO RELATED APPLICATIONS

This application is a division of U.S. patent application Ser. No. 11/776,638, filed Jul. 12, 2007, which is incorporated by reference as if fully set forth.

BACKGROUND

The present invention relates to an eccentric tensioning device for tensioning a traction means constructed, for example, as a flat belt or toothed belt, in a traction means drive. In particular, the invention here relates to an eccentric tensioning device, which is provided for integration into a traction means drive of an internal combustion engine, which automatically guarantees a required pretensioning of the traction means through an adjustment moment generated on the side of a spring device.

Such a tensioning device is known, for example, from DE 40 33 777 A1. This conventional tensioning device, also designated as a double eccentric tensioning device, comprises an adjustment eccentric, which makes available a bore arranged eccentrically for receiving an attachment screw. By means of the attachment screw, the tensioning device is mounted on a housing, especially a housing of the internal combustion engine, wherein the adjustment eccentric is supported by means of a base plate on the housing. Placed on this adjustment eccentric is a working or operating eccentric, with there being a plain or slide bearing in an annular gap between a casing surface of the adjustment eccentric and an inner wall of the operating eccentric. On the outside, a rolling bearing surrounds the operating eccentric, whose outer ring provides the function of a running disk, which in the installed state presses against the traction means of the traction means drive and applies a force to this with a transverse force extending perpendicular to the running direction. For achieving a firm contact of the running disk on the traction means, between the base plate and the operating eccentric there is a torsion spring, which forces the operating eccentric and the running disk connected to this operating eccentric continuously into a position loading and thus tensioning the traction means.

SUMMARY

The invention is based on the objective of creating solutions, through which advantages are produced under assembly-specific aspects in the installation of tensioning devices of the type noted above.

This task is achieved according to the invention by an eccentric tensioning device for a traction means drive, with:
a track roller device, which as such comprises a running disk and a rolling bearing provided for supporting the running disk,
a work eccentric for supporting the track roller device such that it can be displaced in a radial direction relative to the rotating axis of the rolling bearing through pivoting of the work eccentric,
a torsion spring for pretensioning the work eccentric, and
a fixing device for securing the work eccentric in a mounting position, in which the torsion spring is located in pretensioned state,
wherein the fixing device is constructed such that it is led into a released state, in which the running disk is forced under the effect of the work eccentric radially relative to the rotating axis of the rolling bearing against the associated traction means, within the scope of attaching the eccentric tensioning device to a flange surface carrying this device.

Therefore, in an advantageous way it becomes possible to create a tensioning device, in which during the mounting of the traction means, the work or operating eccentric is fixed in an end position under pretensioning of the torsion spring, wherein this secured state can be released by the installation of the tensioning device. The work eccentric is preferably fixed in each mounting position so that relative movements between the work eccentric and the base plate and/or the adjustment eccentric are prevented.

According to an especially preferred embodiment of the invention, the fixing device is constructed such that this automatically detaches in the course of tightening an attachment screw, through which as such the eccentric tensioning device, in particular the adjustment eccentric of this device, is screwed onto a flange surface carrying the tensioning device. This automatic detachment or release process of the fixing device can be initiated, in particular, in that a free switching path is traversed or an axial play provided in the tensioning device is overcome within the scope of attaching the eccentric tensioning device to the flange surface of components of the tensioning device under the effect of the axial force applied by the attachment screw. In the course of overcoming this axial play, especially against an axial force applied by the torsion spring or by secondary support structures, an engagement structure of the fixing device can be brought into a released state.

The engagement structure is preferably coupled rigidly with the work eccentric. In particular, it is possible to shape the engagement structure so that this is connected to the work eccentric via an indexer arm.

The fixing device according to the invention is preferably shaped so that in the mounting position, the engagement structure is engaged with a holding element, which is provided by the base plate. The engagement structure is brought into the released state preferably through axial displacement of the engagement structure relative to the holding element.

The spring device provided for generating the torsion moment pivoting the work eccentric is preferably constructed as a helical spring. This helical spring can be embodied so that it has several spring windings. The helical spring can be constructed as a leg-less helical spring, so that the forces generated by this helical spring are introduced via the ends of the spring ends and optionally via a peripheral section offset from these ends by an angle of typically 90° into the appropriate components loaded by the spring. The spring can also be provided in the area of the spring ends with engagement structures, especially in the form of hook sections formed by radially inwards or outwards bent wire ends. The spring device can be shaped in terms of the cross section of the spring wire so that this has a polygonal, in particular a square or flat cross section. Furthermore, the spring device is preferably shaped so that in the installed state, this is also at least slightly flattened, e.g., to 30% of its length in the axially unloaded state.

The tensioning device according to the invention preferably comprises a damping or braking device, which as such is used for generating an eccentric braking moment, through which the pivoting of the work eccentric is braked. This damping or braking device can be formed by an axially loaded disk structure, by a radially loaded bushing structure, or also by a cone structure. Preferably, at least one part of the loading force acting on this damping or braking device is generated or transmitted by the torsion spring.

The work eccentric can be made from a plastic material. Furthermore, it is also possible to construct the work eccentric in one piece with the inner ring of the rolling bearing. Furthermore, it is also possible to construct the running disk in one piece with the outer ring of the rolling bearing.

According to an especially preferred embodiment of the invention, the work eccentric is supported on an adjustment eccentric. Through the fixing device according to the invention, preferably the position of the work eccentric is also fixed relative to the adjustment eccentric. It is possible to shape the tensioning device structurally so that the adjustment eccentric can be displaced by a small distance axially relative to the work eccentric or a base plate, wherein the released state of the fixing device can be generated in the course of the axial displacement of the adjustment eccentric, especially under the action of the attachment screw.

The base plate is preferably shaped such that this comprises an annular disk section provided for mounting on the flange surface. This annular disk section can be shaped so that this is coupled locked in rotation with a bearing bushing in the area of an inner peripheral edge.

On the base plate, a projection or some other engagement structure can be formed, which as such is used for rotationally locked anchoring of the base plate on the flange surface. Preferably, the projection is shaped so that the rotationally locked anchoring of the base plate on the flange surface is reached before the axial release path has been overcome.

As an alternative to the previously described measures, it is also possible to shape the tensioning device according to the invention so that the creation of the released state is not realized through axial loading of the tension roller device, but instead, for example, by pivoting the work eccentric back against the pivoting direction caused by the torsion spring. In this pivoted back even farther state, a spring elastic locking element preloaded, for example, in a released position, can be unlocked and here can release the work eccentric, so that this is pivoted towards the traction means running path under the effect of the torsion spring and thus the running disk can be lowered onto the traction means.

It is also possible to shape the tensioning device so that the generation of the released state is realized by an overload moment also introduced into the work eccentric and acting in the direction of the tensioning moment generated by the torsion spring.

Preferably securing means are provided, through which re-engagement of the fixing device is prevented. In this way it becomes possible to guarantee that no inadvertent relocking of the fixing device is performed during the operation of the tensioning device.

The invention includes, in particular, the following variants:

Variant 1

Before the mounting of the tensioning device, this is pretensioned into the delivery state. A radially directed indexer connected to the operating eccentric is supported with a firm fit and/or a positive fit on a holding element of the base plate or the adjustment eccentric. Here, the work eccentric and thus the indexer connected to it are pressed and thus fixed in position on the holding element of the base plate due to the force of the torsion spring with a rotationally non-positive fit. The indexer assumes this position through a limited axial displacement of the work eccentric relative to the adjustment eccentric, wherein this displacement acts against an axial force component of the torsion spring. From this starting position, the tensioning device is positioned loosely, i.e., without rigid attachment, to the internal combustion engine, with the help of the attachment screw. By means of the base plate in connection with an axially extending projection, which engages in a corresponding bore or receptacle of the internal combustion engine in the area of the flange surface, an aligned installation position of the tensioning device is set. In the mounting position, the operating eccentric is fixed at an end stop, which is also designated as a hot stop, whereby the traction means, in particular a belt, can be mounted easily, i.e., can be placed on all of the running disks of the traction means drive. After successful mounting of the traction means, with the help of the attachment screw, the tensioning device is fixed rigidly to the housing of the internal combustion engine. In sync with the tightening of the attachment screw, the adjustment eccentric and the base plate connected to this eccentric are displaced axially in the direction of the internal combustion engine, whereby the indexer connected in one piece with the base plate detaches from the holding element and the torsion spring turns the operating eccentric into a position pretensioning the traction means. The release of the indexer and thus the work eccentric from the locking during the mounting position is then reached as soon as an axial play "S" between the work eccentric and the base plate or the adjustment eccentric is equalized or reduced by tightening the tensioning device.

Variant 2

For achieving effective transport locking, which prevents relative movement between the work eccentric and the base plate in the mounting position, an indexer connected to the work eccentric or a similarly formed object is actively connected to a stop of the base plate. The locking can be realized through suitable shaping of the base plate alone or with the help of additional elements, e.g., splints or a plate, which are removed after the traction means are placed, in order to tension the traction means.

Variant 3

Another variant for positioning the operating or work eccentric in a mounting position provides for the shaping of the locking device for maintaining the pretensioned torsion spring, so that this does not exceed the radial outer contours of the tensioning unit. Suitable for this purpose is, for example, a groove or recess formed on the end towards the flange surface of the internal combustion engine in the work eccentric or in the base plate, in which a locking device is engaged through a positive fit, force-generated fit, or through a combination of these two fits, in order to prevent rotational movement of the work eccentric relative to the base plate or the adjustment eccentric in the mounting position. The object interacting with the groove or the recess, which is located according to the arrangement of the connecting rod either on the base plate or the work eccentric, can be constructed as a bent part, cast part, or as an add-on part (e.g., as a dowel pin). The projection of the object out of the groove or the recess in the direction of the beginning of the groove is prevented by the clamping of the work eccentric and the associated limiting of the axial play of the tensioning unit. According to another embodiment, the object encompasses the work eccentric. In the mounting position, in particular a molded part connected to the base plate engages in a groove or recess of the work eccentric. Due to the axial force of the torsion spring, in the mounting position there is effective locking between the base plate and the work eccentric.

The invention is directed, in particular, to tensioning devices, which guarantee a nearly constant pretensioning force of the traction means under all operating conditions and with which a long service life can be achieved. The measures according to the invention allow a semi-automated setting of the desired traction means force for the first assembly and for service work for equalizing:

diameter and positional tolerances of the individual disks of the traction means drive;

length tolerances of the traction means, especially toothed belts;

belt wear;

temperature differences;

and effects due to the dynamic behavior of the internal combustion engine.

The invention is further directed also to a method for integrating an eccentric tensioning device in a traction means drive of an internal combustion engine, in which an eccentric tensioning device located in a pretensioned state is partially attached to a flange surface within the scope of a prepared assembly step, such that the eccentric tensioning device remains in a pretensioned state, wherein in this pretensioned state the eccentric tensioning device is configured and oriented such that the running roller of this device has a large distance from the traction means running path, and wherein the eccentric tensioning device is brought into a released state through tightening of an attachment screw used for the fastening, in which the pretensioned state is released and the running roller is lowered onto the associated traction means of the traction means drive.

BRIEF DESCRIPTION OF THE DRAWINGS

Additional details and features of the invention emerge from the following description in connection with the drawing. Shown are.

DETAILED DESCRIPTION OF THE PREFERRED EMBODIMENTS

Figure 1:
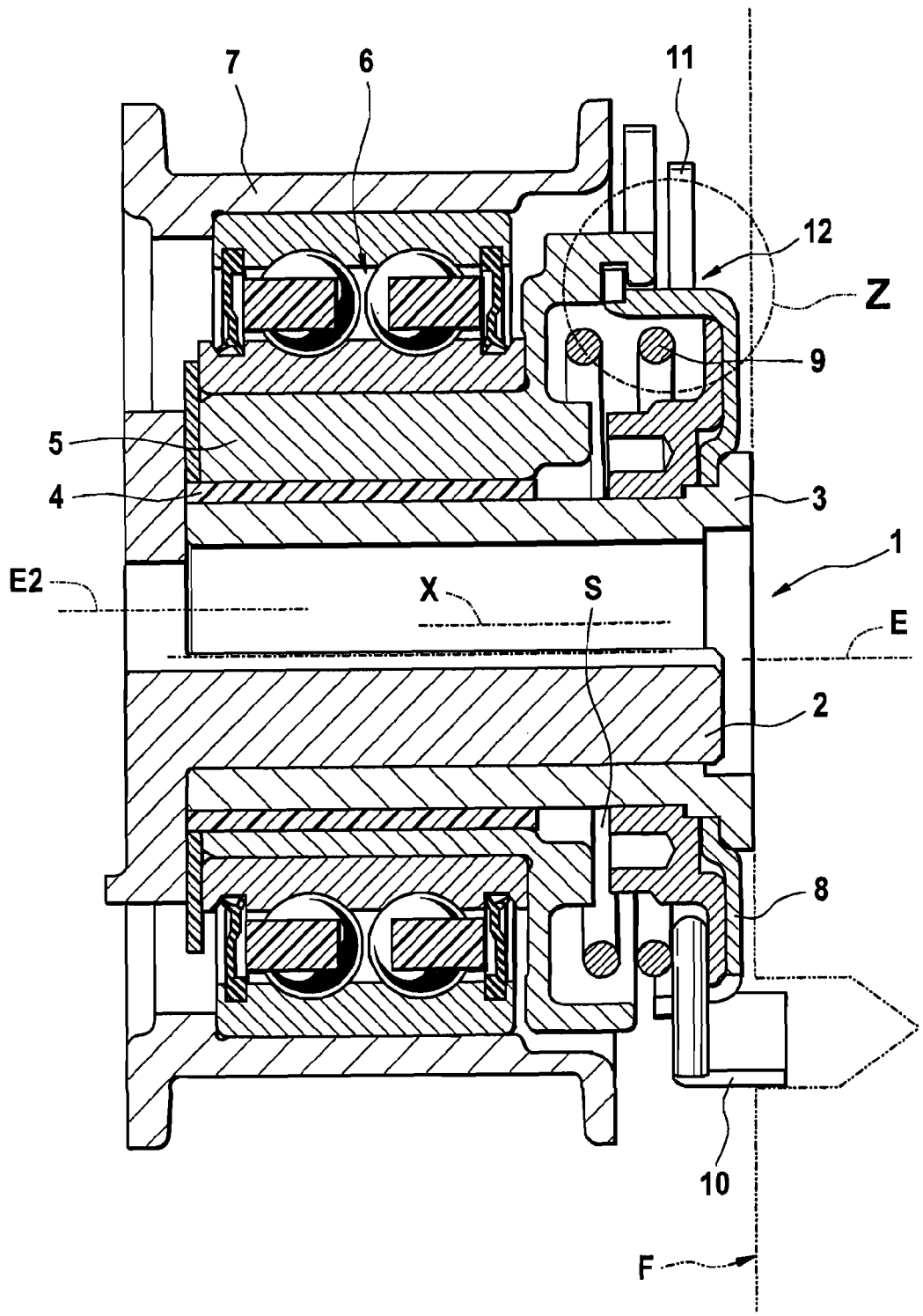
FIG. 1 an axial section view for illustrating the construction of a double eccentric tensioning device according to the invention, FIG. 2 a perspective view of the base plate of the eccentric tensioning device according to FIG. 1, FIG. 3 a perspective view of the work eccentric of the tensioning device according to FIG. 1, FIG. 4 a detail view for illustrating the construction of the fixing device of the eccentric tensioning device according to FIG. 1, FIG. 5 another axial section view for illustrating the eccentric tensioning device according to the invention, here in a state axially inserted and thus brought into a released position, FIG. 6 a perspective view of the work eccentric of an eccentric tensioning device according to the invention according to a second embodiment of the invention, FIG. 7 a perspective view of a base plate structure, which as such interacts with the work eccentric according to FIG. 6, FIG. 8 a perspective view of a tensioning device formed with the inclusion of the work eccentric and the base plate according to FIGS. 6 and 7, FIG. 9 a perspective exploded view for illustrating the construction of the eccentric tensioning device according to FIG. 8, FIG. 10 another perspective view for illustrating the double eccentric tensioning device according to FIG. 8 in unlocked state, FIG. 11 a perspective detailed view for illustrating the engagement state of the fixing device in a double eccentric tensioning device according to FIG. 8, FIG. 12 a perspective view of a double eccentric tensioning device according to a third embodiment of the invention, FIG. 13 a perspective view of a double eccentric tensioning device according to the invention according to a fourth embodiment of the invention with an indexer device blocked by a stop, FIG. 14 a side view for illustrating additional details of the double eccentric tensioning device according to FIG. 12, FIG. 15 a perspective view of a fifth embodiment of a double eccentric tensioning device according to the invention with a securing pin lying outside of the periphery of the tension roller device, FIG. 16 a perspective view of the base plate of the double eccentric tensioning device according to FIG. 15, FIG. 17a a perspective view of the base plate for a double eccentric tensioning device according to a fifth embodiment of the invention, FIG. 17b a sketch for illustrating the function of the fixing device formed in interaction with the base plate according to FIG. 17a, FIG. 18 another sketch for illustrating the construction of a base plate for realizing a fixing device according to the invention, FIG. 19 a view for illustrating the individual phases of the mounting process for connecting the tensioning device according to the invention to an internal combustion engine, FIG. 20 a basic sketch for illustrating another mechanism for automatically releasing a tensioning device according to the invention, FIG. 21 a basic sketch for illustrating another variant of an automatically releasable fixing device, FIG. 22 another sketch for illustrating a fixing device according to the invention with a spring elastic securing arm pretensioned into a released position.

FIG. 1 shows a tensioning device according to the invention in the form of an axial section view. The tensioning device 1 comprises an adjustment eccentric 2, which is inserted into a carrier body 3 constructed as a cylindrical bushing, by means of which the tensioning device 1 in connection with an attachment screw not shown in FIG. 1 can be connected to a flange surface F, especially an end of an internal combustion engine.

The tensioning device 1 further comprises a work or operating eccentric 5, which is arranged rotatably on the carrier body 3 by means of a plain or slide bearing 4. On the outside, the work eccentric 5 is surrounded by a rolling bearing 6, on which in turn a running disk 7 is positioned, which makes firm contact with a traction means with in the installed state.

For pretensioning and rotating the work eccentric 5 into a position pretensioning the traction means, a torsion spring 9 is provided, which is supported with a first spring end on the work eccentric 5 and with the other spring end on a base plate 8. This base plate 8 is connected locked in rotation with the carrier body 3 in this embodiment.

The adjustment eccentric 2 can pivot about a pivoting axis E2 defined by the attachment screw. The work eccentric 5 can pivot about an eccentric axis E defined by the outer peripheral surface of the carrier body. This eccentric axis E is radially offset relative to a rotating axis X of the rolling bearing 6. For integrating a traction means into the corresponding traction means drive, the work eccentric 5 and the adjustment eccentric 2 are each arranged in a pivoted position, in which the greatest possible distance of the traction means running surface of the running disk 7 from the traction means running path is produced.

For guaranteeing the installation of the tensioning device in a required installation orientation, i.e., for guaranteeing an aligned installation position of the tensioning device, the base plate 8 is provided with an axially extending projection 10, which engages in a corresponding receptacle of the internal combustion engine (indicated here as a bore) provided in the area of the flange surface.

An indexer 11 arranged locally on the work eccentric 5 illustrates the pivoted position of the work eccentric 5 in the installed state of the tensioning device 1. The tensioning device 1 is constructed such that an axial play "S" initially remaining between an end face of the work eccentric 5 and the base plate 8 is eliminated within the scope of the mounting of the tensioning device, especially tightening the attachment screw (as has already happened here).

The tensioning device according to the invention comprises a locking device 12, which automatically detaches within the scope of the advancing attachment of the tensioning device to the internal combustion engine and after placement of a traction means in the traction means drive due to a completed mounting step.

The following description relates in particular to the locking device 12 according to the invention and active here between the base plate 8 and the work eccentric. The mounting step provided for releasing this locking device includes completing the tightening of the attachment screw not shown here in more detail. During this tightening, the axial play S mentioned above is overcome and the work eccentric 5 unlocked in this way pivots automatically into a position pretensioning the traction means under the effect of the torsion spring 9.

Figure 2:
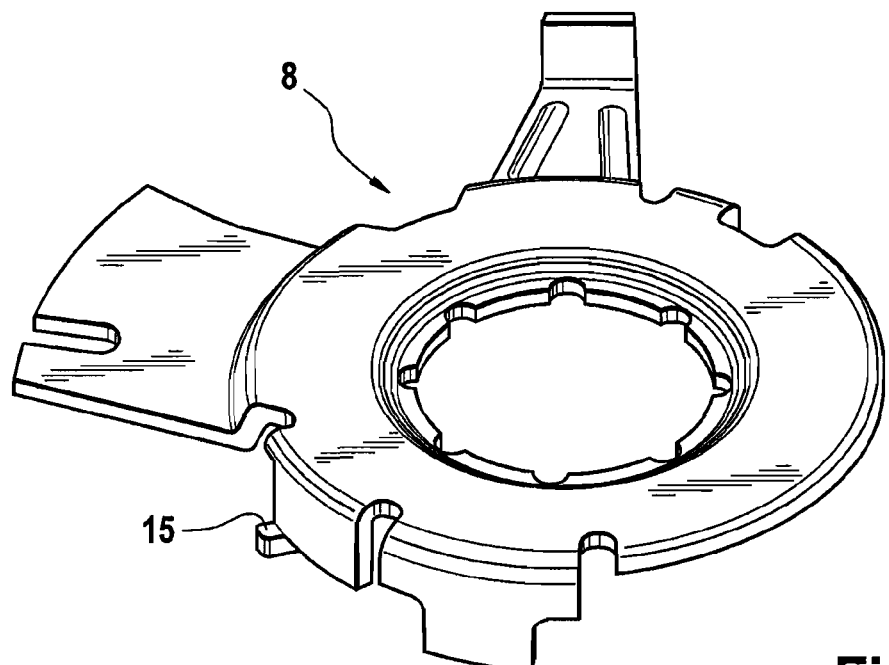
Figure 3:
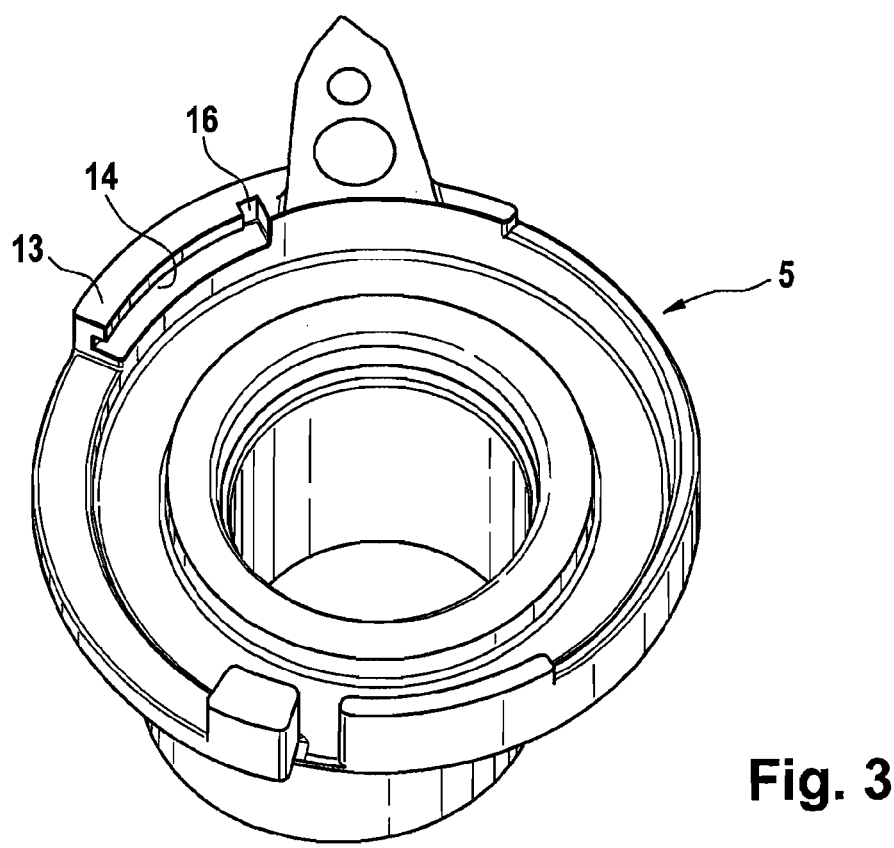
Figure 4:
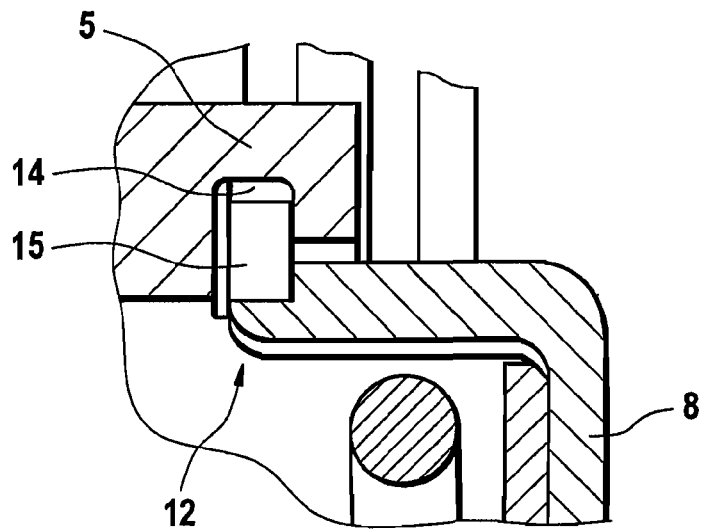
Figure 5:
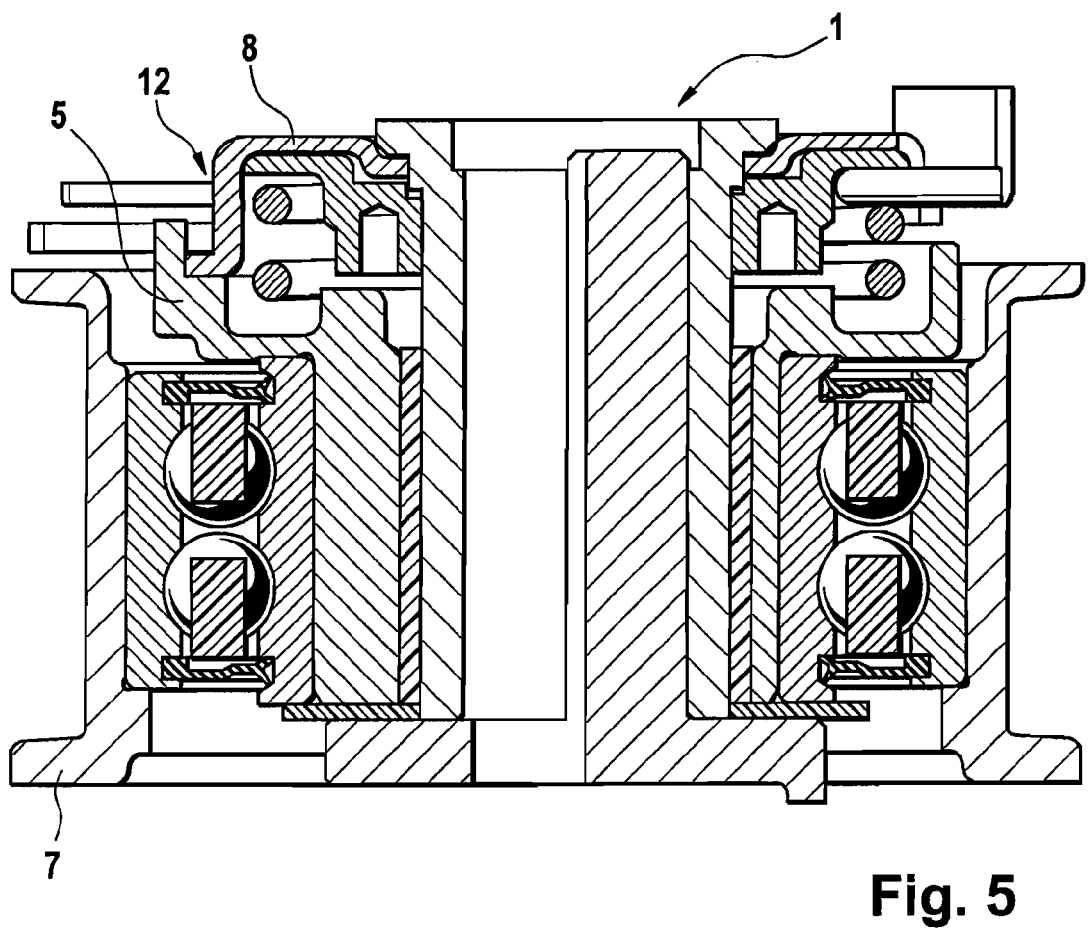
Figure 6:
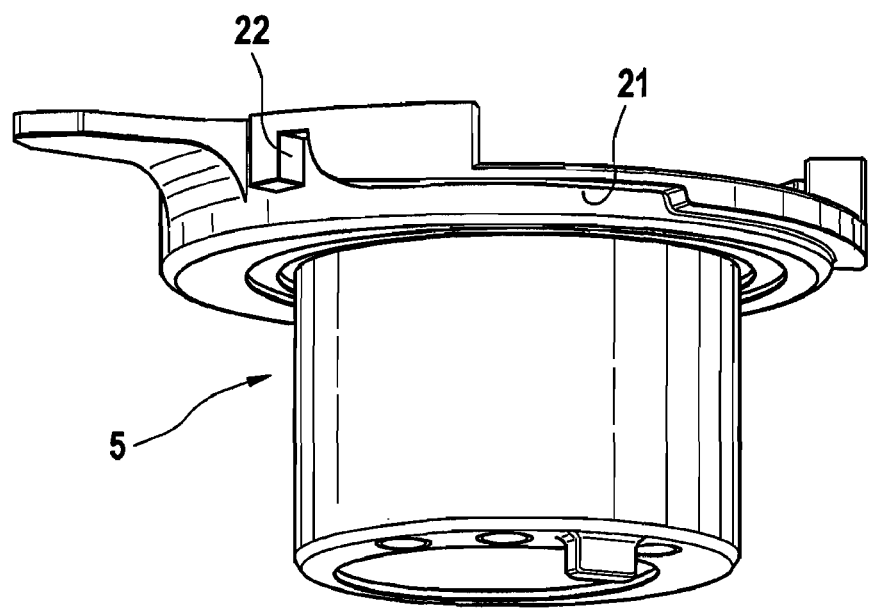
Figure 7:
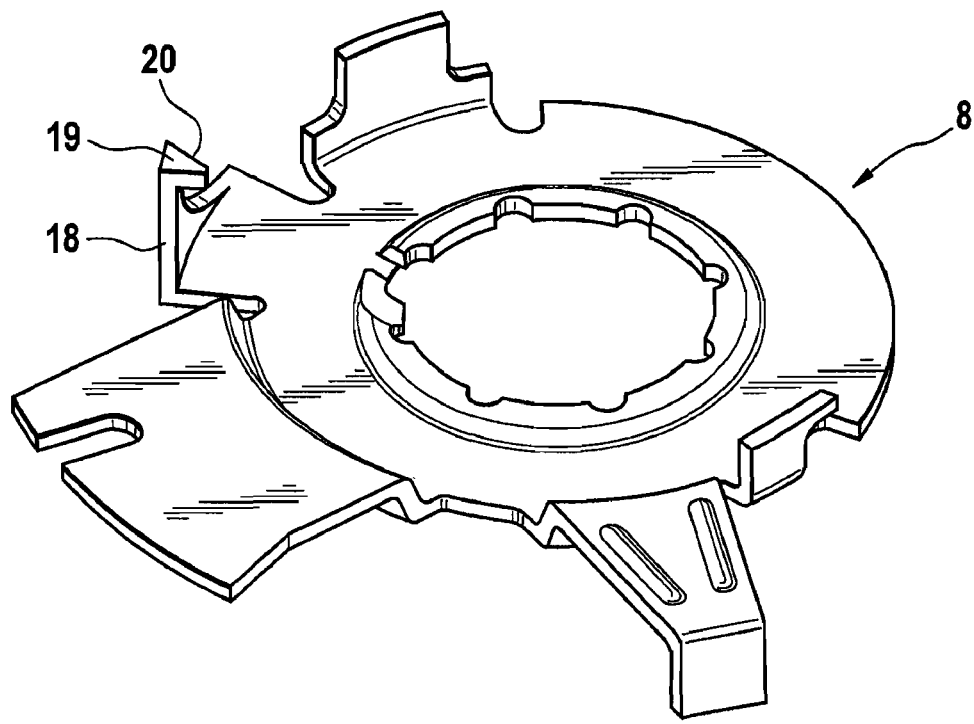

The construction and the function of the locking device 12 between the base plate 8 and the work eccentric 5 is further illustrated in FIGS. 4 and 5. FIGS. 2 and 3 also belonging to this first embodiment show structural details of the locking device 12 with reference to detailed drawings.

Here, FIG. 3 shows in the form of a perspective view how the work eccentric 5 is used in the tensioning device according to FIG. 1. The work eccentric 5 comprises an axially projecting section 13, in which a recess or groove 14 and an engagement recess 16 is formed.

For locking the tensioning device 1 in a pretensioned mounting state, a radial cam 15 constructed in one piece with the base plate 8 shown in FIG. 2 locks in the engagement recess 16. A block can prevent the cam 15 from leaving the groove 14 in the direction of a beginning of the groove 16.

As an alternative to the previously described locking device 12, it is also possible to arrange this so that the engagement recess 16 or the groove 14 is allocated to the base plate 8 and the cam 15 is allocated to the work eccentric 5.

Automatic detachment of the locking device 12 is realized through tightening of the attachment screw, in which the axial play "S" (FIG. 1) between the end face of the work eccentric 5 and the base plate 8 is simultaneously reduced, whereby the cam 15 detaches from the engagement recess 16 and is inserted into the groove 14. In this way, a released state is reached, in which the work eccentric 5 automatically pivots into a position pretensioning the traction means.

FIG. 4 shows in the form of an enlarged view the detail designated by the reference symbol Z in FIG. 1. In the released state shown here, the cam 15 connected to the base plate 8 is inserted into the groove 14.

FIG. 5 shows the tensioning device 1 in a view, from which the construction of the locking device 12 becomes clearer. The tensioning device is located in the state shown here in a released position, in which pivoting of the work eccentric 5 is allowed.

In FIGS. 6 to 11, a second embodiment of a tensioning device according to the invention is shown, which differs from the first embodiment especially in terms of the shape of the fixing device or locking device 17.

For realizing the locking device 17, the base plate 8 is provided locally with an axially extending projection 18. A radially inwardly directed projection 19 is formed on the end on this projection 18. According to the shape of the projection 19, the work eccentric 5 has a corresponding recess 21 or groove 22, in which the projection 19 locks with a positive fit in the mounting position, i.e., in the pretensioned state.

Figure 8:
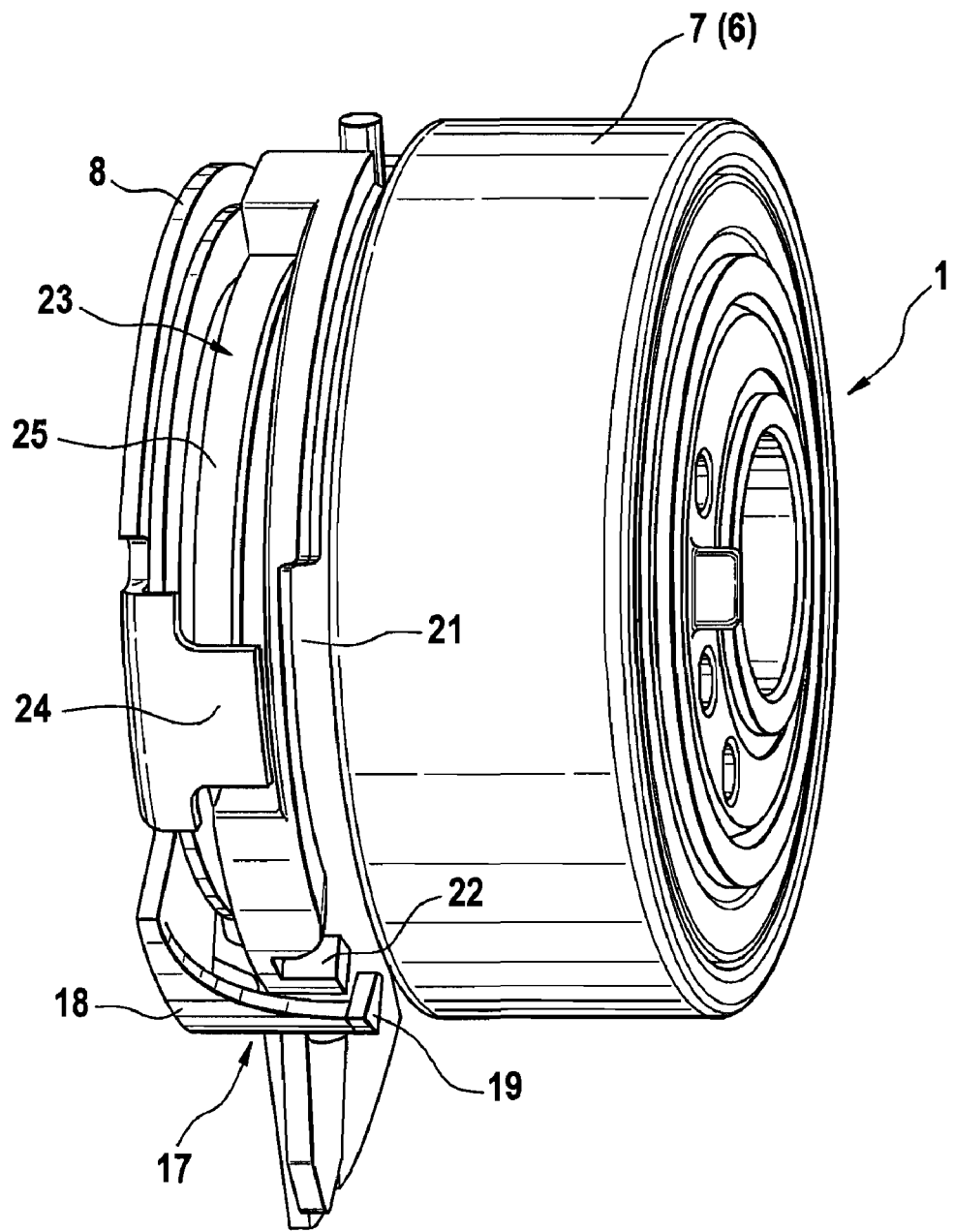

As FIG. 8 shows, the projection 18 of the base plate 8 surrounds the outer contours of the work eccentric 5 in the region of the groove 22 or recess 21, wherein the radial outer contours of the running disk 7 are not exceeded.

Furthermore, according to FIG. 8 the tensioning device 1 is provided with a rotation limiter 23 for the work eccentric 5. For this purpose, the base plate 8 has a locally bent rim 24, which engages with a positive fit in a recess 25 of the work eccentric 5, wherein the extent of the recess 25 determines the maximum rotation of the work eccentric 5 relative to the base plate 8.

Figure 9:
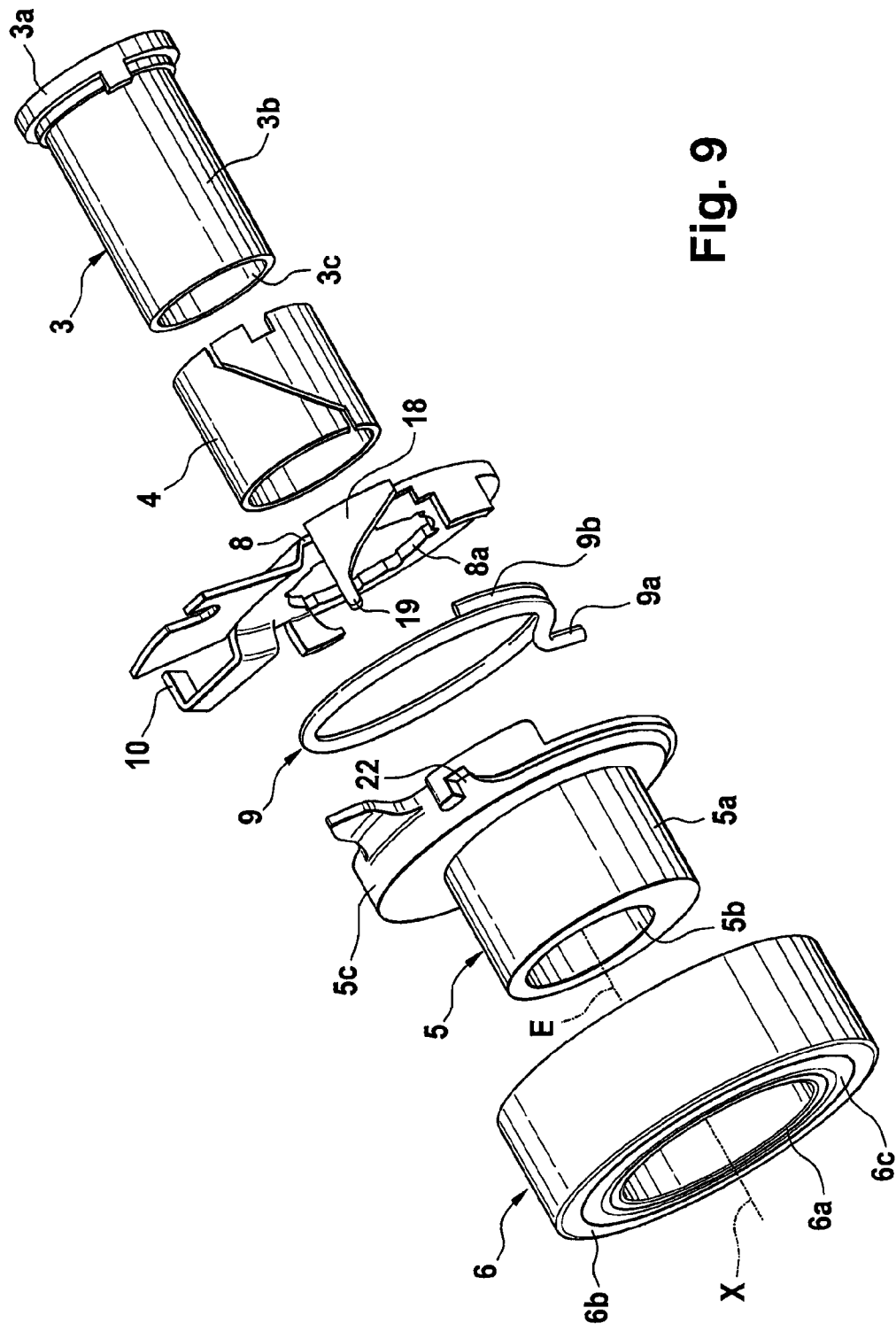

In FIG. 9, in the form of a perspective exploded view a tensioner optimized with respect to carrying out a mounting process is shown for a traction means drive. This tensioner corresponds essentially to the tensioner described previously in connection with FIGS. 6 to 8. The statements regarding these figures apply analogously in this respect. As can be seen from this illustration, the mounting-optimized tensioning device comprises a rolling bearing 6, which is constructed as a sealed, double-row ball bearing and which comprises its own inner ring 6a, an outer ring 6b, and a bearing seal 6c. This rolling bearing 6 sits on an outer peripheral surface 5a of the work eccentric 5 over the cylindrical inner surface formed by the inner ring 6a. The work eccentric 5 is constructed such that an eccentric axis E defined by its inner bore 5b is radially offset relative to a rolling bearing rotating axis X defined by the inner ring 6a. This degree of offset corresponds to half the maximum necessary radial adjustment tensioning lift of the work eccentric in the operating state of this eccentric. The coupling of an adjustment tensioning torque pivoting the work eccentric 5 is performed under the effect of the torsion spring 9 shown here and constructed as a helical spring. This torsion spring 9 is supported on an inner region that cannot be seen here in more detail in a bell-shaped section 5c of the work eccentric 5. In the embodiment shown here, the rotationally locked anchoring of the torsion spring 9 on the work eccentric 5 is realized by a radially outwardly bent engagement end 9a of the torsion spring 9. Preferably, the attachment of the torsion spring 9 on the work eccentric 5 is implemented such that a sufficiently more reliable engagement is also guaranteed under unfavorable operating or mounting conditions. It is possible to provide retaining elements, through which an especially reliable coupling state between the torsion spring 9 and the work eccentric 5 is guaranteed on the work eccentric 5, on the torsion spring 9, or also via additional securing structures. In the embodiment shown here, the torsion spring 9 is supported with its second end section 9b on the base plate 8. The base plate 8 forms a structural component, which can be flanged at the projection 10 already discussed above so that it is locked from rotation to a flange surface provided for receiving the tensioning device, especially an end face of an engine block or cylinder head. In the embodiment shown here, the base plate 8 further forms a structural component, through which the work eccentric 5 can be locked in a pivoted position, in which the torsion spring 9 arranged kinematically between the base plate 8 and the work eccentric 5 is tensioned. This locked position can correspond especially to the position, in which the rolling bearing 6 has been lifted farther from the running path of the associated traction means of a traction means drive. As an alternative to this extreme position, however, it is also possible to shape the locking device, so that the work eccentric 5 is anchored in intermediate positions, in which, for example, only a 90 degree pivoting of the work eccentric 5 takes place. In the embodiment shown here, the locking mechanism comprises a projection 18, which is formed on the base plate 8 and which as such carries a catch structure that is constructed as a projection 19 and that can engage in a counter structure or groove 22 provided on the side of the work eccentric 5, especially the bell section 5c of this eccentric, as can be seen better from the other views.

In the embodiment shown here, an engagement state set between the base plate 8 and the work eccentric 5 is released, in that the work eccentric 5 is pushed in a direction of its eccentric axis E towards the base plate 8, so that the projection 19 moves axially out of the groove 22 and thus unlocks the work eccentric 5 in the peripheral direction and thus allows pivoting of this eccentric under the effect of the pivoting moment applied by the torsion spring 9. The pivoting coupling of the work eccentric 5 with the base plate 8 is implemented in this embodiment by a carrier body 3 constructed as a bushing, which here is coupled preferably locked in rotation with an inner peripheral region 8a of the base plate 8. This coupling can be realized, in particular, by pressing a foot region 3a of the carrier body 3 into the base plate 8.

Preferably, the work eccentric 5 does not sit directly on an outer peripheral surface 3b provided by the carrier body 3, but instead sits on the carrier body 3 under inclusion of a bushing constructed as a slide bearing, as shown here. The slide bearing 4 can be constructed, so that a certain friction moment is generated by this bearing, through which the pivoting motion of the work eccentric 5 is braked or damped on the carrier body 3.

It is possible to shape the slide bearing 4 so that different braking moments for moving the work eccentric 5 in the adjustment tensioning direction and also in the counter direction are generated by this bearing. For this purpose, it is possible, in particular, to construct the slide bearing bushing 4 as a slotted structure, so that especially when the work eccentric 5 pivots against the adjustment tensioning direction, a greater friction moment is produced than when the work eccentric 5 pivots in the adjustment tensioning direction. For this purpose, it is possible to anchor the slide bearing bushing 4 locked in rotation either on the work eccentric 5 or on the carrier body 3, as shown here.

The mounting-optimized tensioning device according to the invention can also be shaped in some other way in terms of the torsion spring device and also especially in terms of the damping device. In particular, it is also possible to provide friction disk structures, through which the pivoting motion of the work eccentric 5 is also braked or damped in a defined way relative to the base plate 8.

The attachment of the mounting-optimized tensioning device shown here can be performed by an attachment screw, which as such is passed through the inner bore 3c provided by the carrier body 3. This inner bore 3c is shaped so that this has a considerably larger diameter than the attachment screw required for sufficient attachment of the tensioning device. The intermediate space remaining between the outer region of the shaft of the corresponding attachment screw and the inner peripheral wall 3c can be filled by an eccentric body formed as an adjustment eccentric, so that in addition to the radial displacement of the rolling bearing 6 achieved by the work eccentric 5, the entire tensioning device can also still be fixed through corresponding pivoting of the adjustment eccentric inserted into the inner bore 3c.

In the embodiment shown here, the axial displacement of the work eccentric 5 towards the base plate takes place within the scope of tightening the attachment screw provided for attaching the tensioning device to an internal combustion engine. In a first mounting step, the attachment screw is tightened only slightly, so that the tensioning device is definitely already sufficiently secured on the internal combustion engine, but the fixing device realized between the base plate 8 and the work eccentric 5 still remains in a secured state. Only after a traction means has been placed in the traction means drive, after the adjustment eccentric is pivoted into a position that is closest to the rolling bearing axis X on the running path of the traction means, is the attachment screw tightened further and thus the fixing device is brought into a released state. As soon as this fixing device is led into the released state, the work eccentric 5 snaps into a tensioned position under the effect of the torsion spring 9 and thus exerts a pressure force on the traction means defined by the tensioning moment generating the torsion moment of the torsion spring 9.

Figure 10:
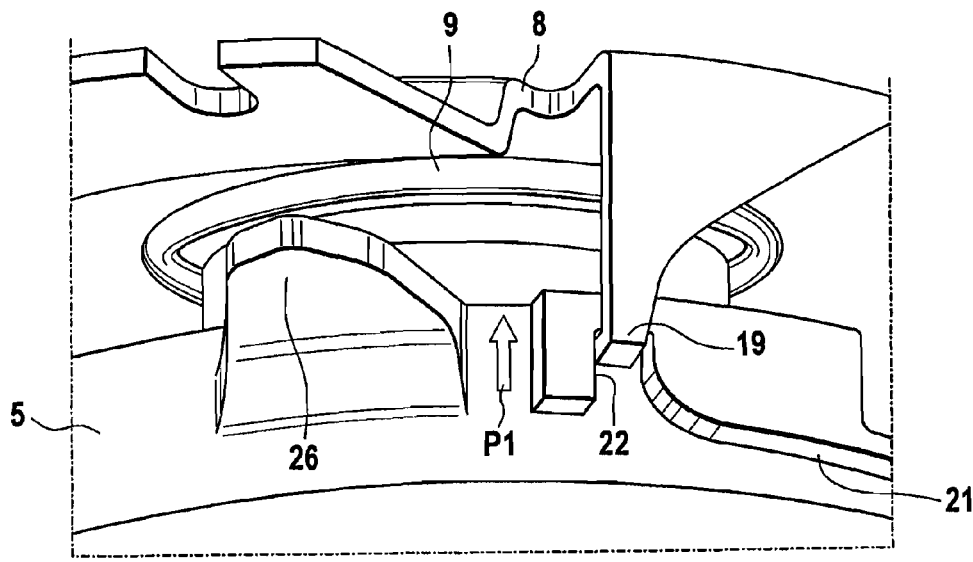

In FIG. 10, in the form of a perspective detailed view, the fixing device provided in the tensioning device according to FIG. 9 is shown in an engaged state. As can be seen in this view, the work eccentric 5 is coupled locked in rotation with the base plate 8. This rotationally locked coupling is constructed by the engagement of the engagement structure constructed as projection 19 with the counter structure provided as engagement groove 22 and provided on the side of the work eccentric 5. By displacing the work eccentric 5 in the direction of the arrow symbol P1 shown here, the projection 19 can move out of the groove 22 into the area of the recess 21 and thus frees the work eccentric 5 relative to the base plate 8. The displacement of the work eccentric 5 is the direction of arrow P1 is realized in this embodiment against an axial force generated by the torsion spring 9. On the work eccentric 5 an indexer 26 is formed, by means of which the pivoted state of the work eccentric 5 can be better seen from the outside. In the embodiment shown here, the fixing device is shaped such that the locking structure engaged with the work eccentric 5 engages radially from the outside into a counter structure provided by the work eccentric 5. However, it is also possible to shape this fixing device, as described in more detail in the following embodiment, such that this engages from the inside into a corresponding counter structure of the work eccentric 5.

Figure 11:
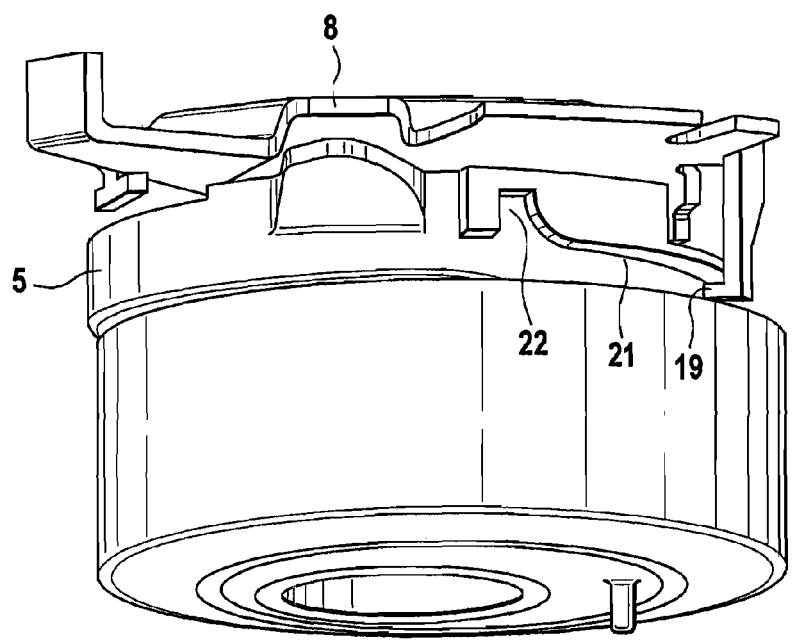

In FIG. 11, the mounting-optimized tensioning device according to the invention from FIGS. 8 to 10 described above is shown in a state, in which the previously described fixing device is located in a detached position, in which the work eccentric 5 can be pivoted freely relative to the base plate 8. As can be seen, the engagement structure constructed as a projection 19 is located in the area of the recess 21 and in this position can no longer engage with the engagement structure constructed as groove 22 provided by the work eccentric 5.

FIGS. 12 to 18 show additional constructions of locking devices according to the invention for the work eccentric 5 relative to the base plate 8.

Figure 12:
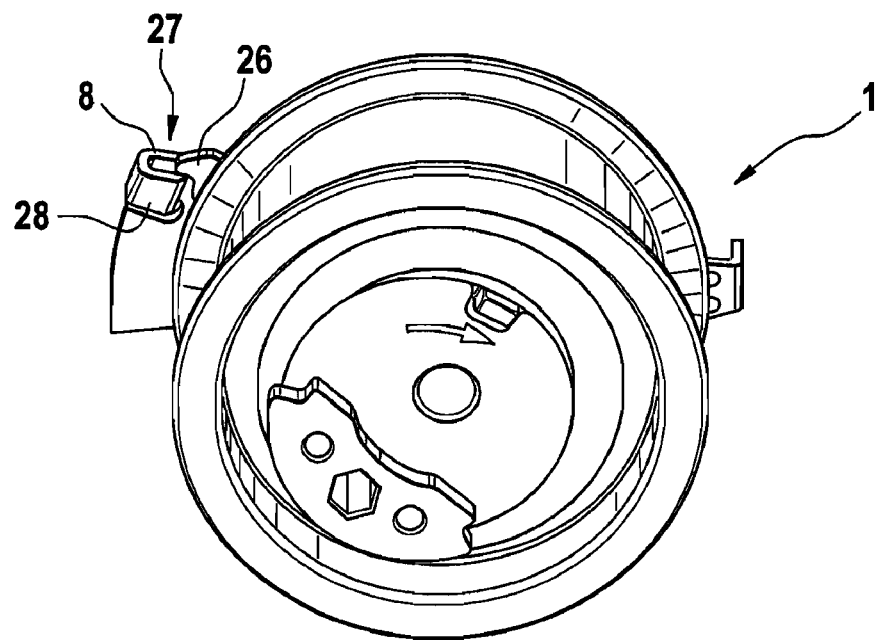
Figure 13:
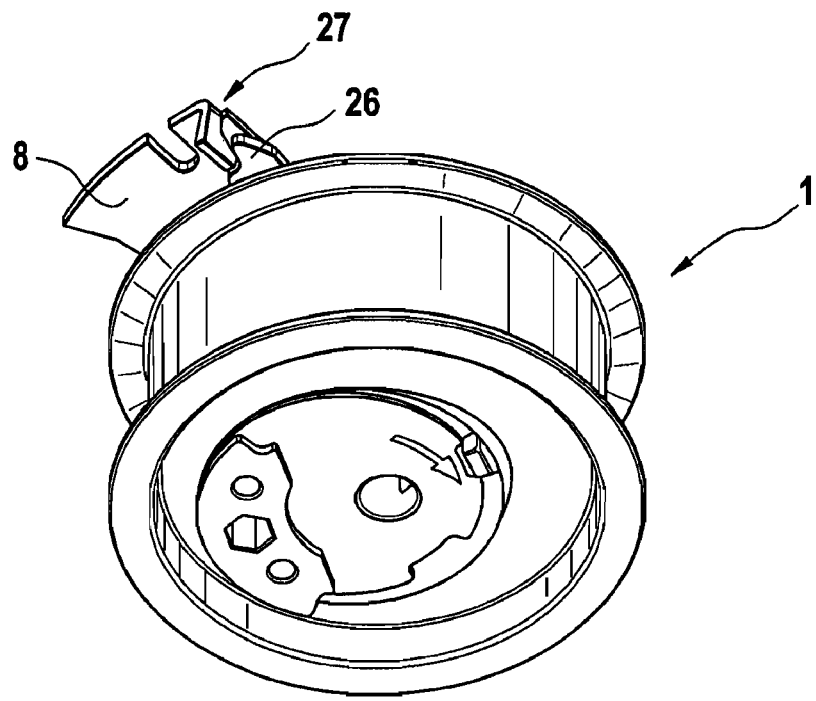
Figure 14:
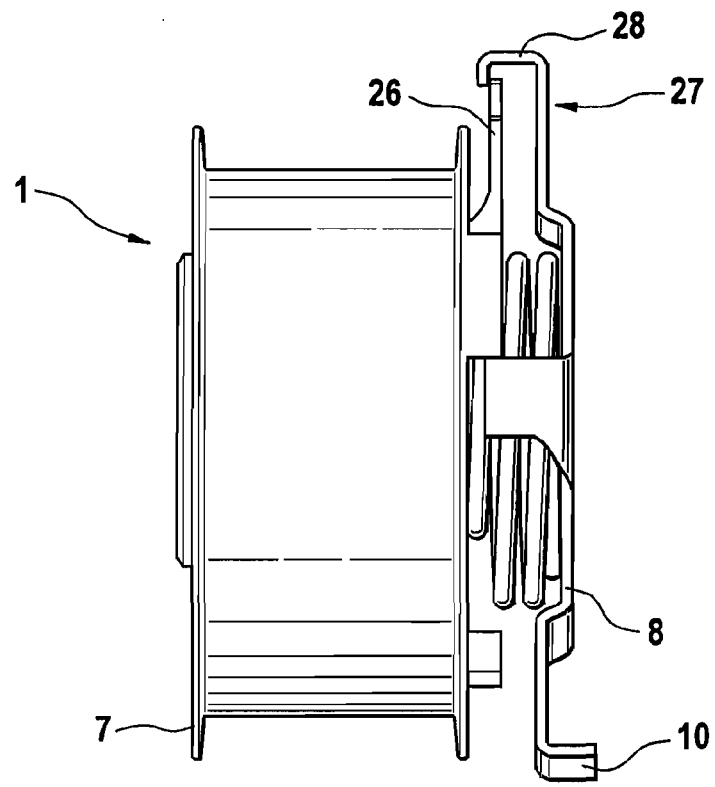

To prevent relative motion between the work eccentric 5 and the base plate 8 in the mounting position, according to FIG. 12 an indexer 26 connected in one piece with the work eccentric 5 is secured on the base plate 8. The locking device 27 can be realized through suitable shaping of the base plate 8 itself or with the help of additional elements, such as a sheet or a splint, wherein these elements must be removed for releasing the work eccentric 5. According to FIG. 12, the locking device 27 comprises a sheet or a sheet clip 28 connected to the base plate 8 with an elongated hole or an inverted U-shaped bend open on one side. In the mounting position of the tensioning device 1, the indexer 26 is supported for forming the locking device 27 with a firm contact fit on the sheet clip 28.

Figure 15:
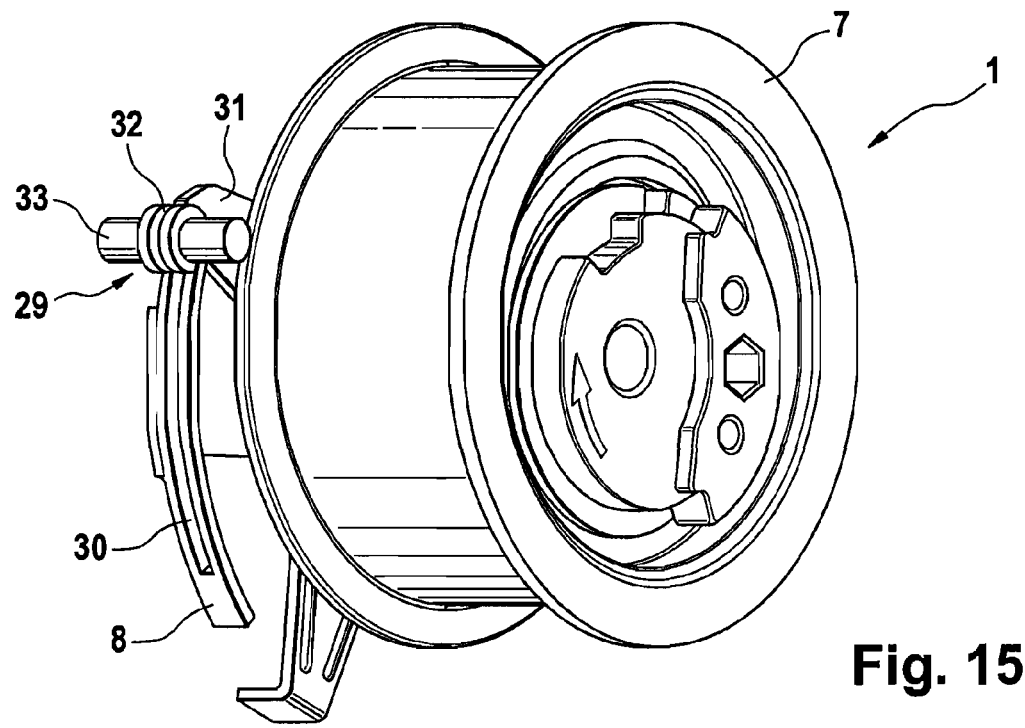

From FIG. 15 the tensioning device 1 is seen in connection with a locking device 29, in which the base plate 8 encloses a guide 30, in which the indexer 31 of the work eccentric 5 is guided. On one end, the guide 30 forms a receptacle 32, which is designed for a pin 33 and with which an end position of the indexer 31 connected in one piece with the work eccentric 5 can be reached.

Figure 16:
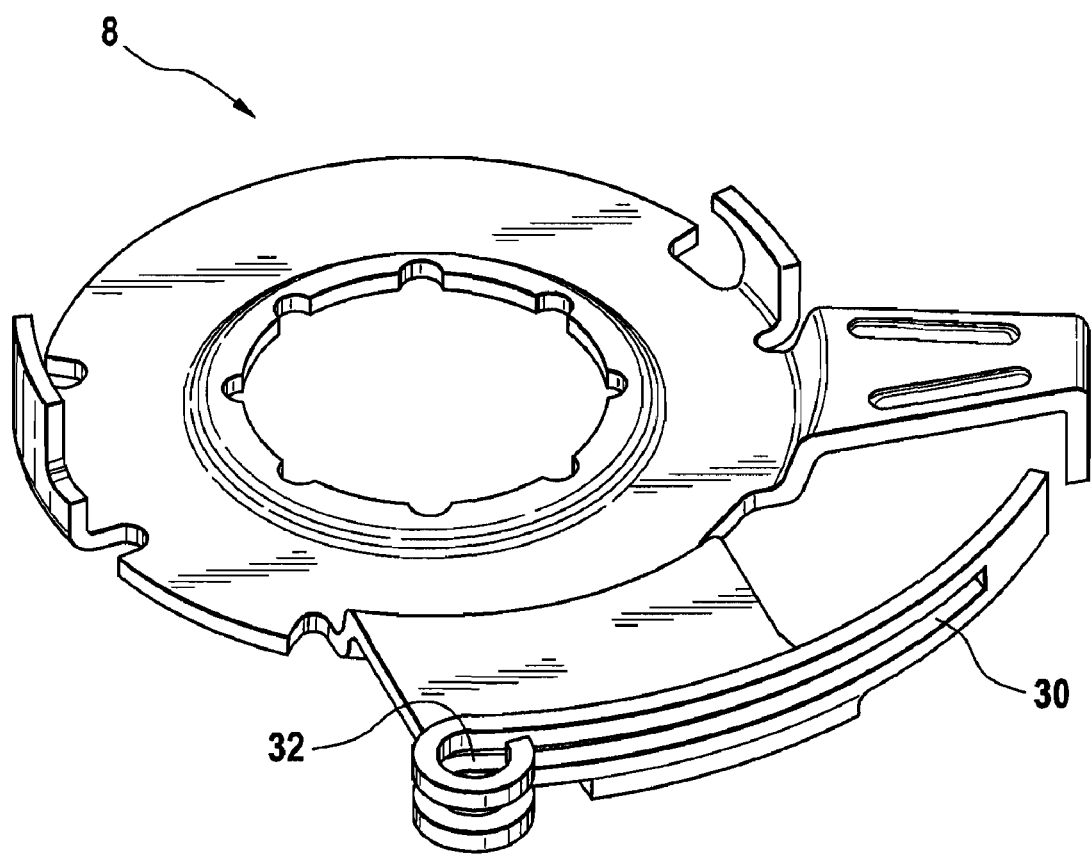

FIG. 16 shows the base plate 8 used in the tensioning device according to FIG. 15 in connection with the guide 30 as an individual part in perspective.

Figure 17A:
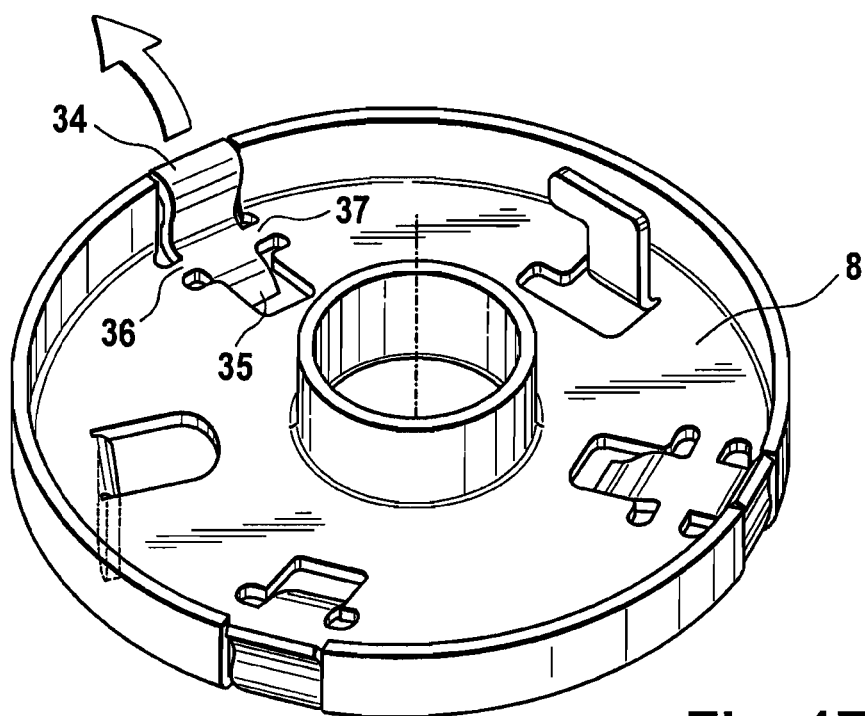
Figure 17B:
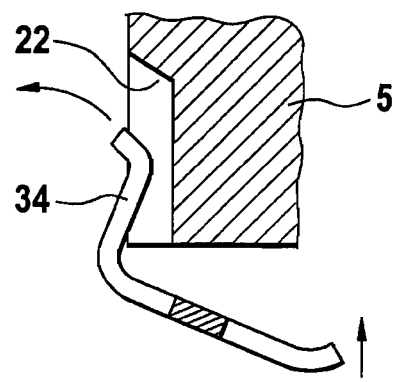

In FIG. 17*a*, in the form of a perspective view, another embodiment for the shaping of a base plate 8 of a mounting-optimized tensioning device according to the invention is shown. This base plate 8 is constructed as a sheet metal drawn part similar to embodiments described above. The base plate forms several pivoting claws 34, which are pivoted radially outwards within the scope of tensioning the base plate 8 on a flange surface carrying the tensioning device. For pivoting the pivoting claws 34, on each of these a pivot wing 35 is formed, which initially contacts the flange surface when the base plate 8 is set and which pivots the entire pivoting claw structure 34 about pivoting sections 36, 37 in the course of further pressing the base plate 8 onto the flange surface. In the embodiment shown here, the pivot sections 36, 37 are shaped so that a slight, plastic deformation of the pivoting claws takes place within the scope the pivoting these pivoting claws 34 outwardly, so that the pivoting claws 34 no longer pivot back into the radially inwards pivoted position not shown here even after subsequent lifting. In this way the pivoting claws 34 are prevented from pivoting back inwards and thus cause an engaged state due to loosening of the tensioning of the base plate on the associated flange surface. Through the structure shown here, it becomes possible to bring the pivoting claws 34, as shown in FIG. 17*b*, in engagement with a groove 22 constructed on the outer periphery of the work eccentric 5 or with some other engagement structure.

Figure 18:
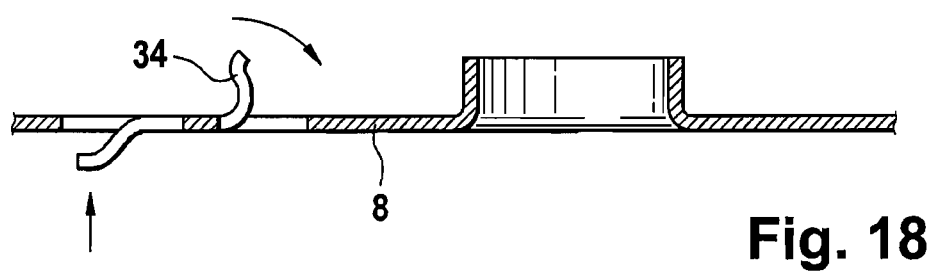

However, it is also possible, as is visible from FIG. 18, to shape the pivoting claws 34 so that these are pivoted inwardly within the scope of placing the base plate 8 on a flange surface not shown here in more detail and thus project out of corresponding catch geometries provided on the side of the work eccentric 5 and thus cause a release of the work eccentric 5 relative to the base plate 8.

Figure 19:
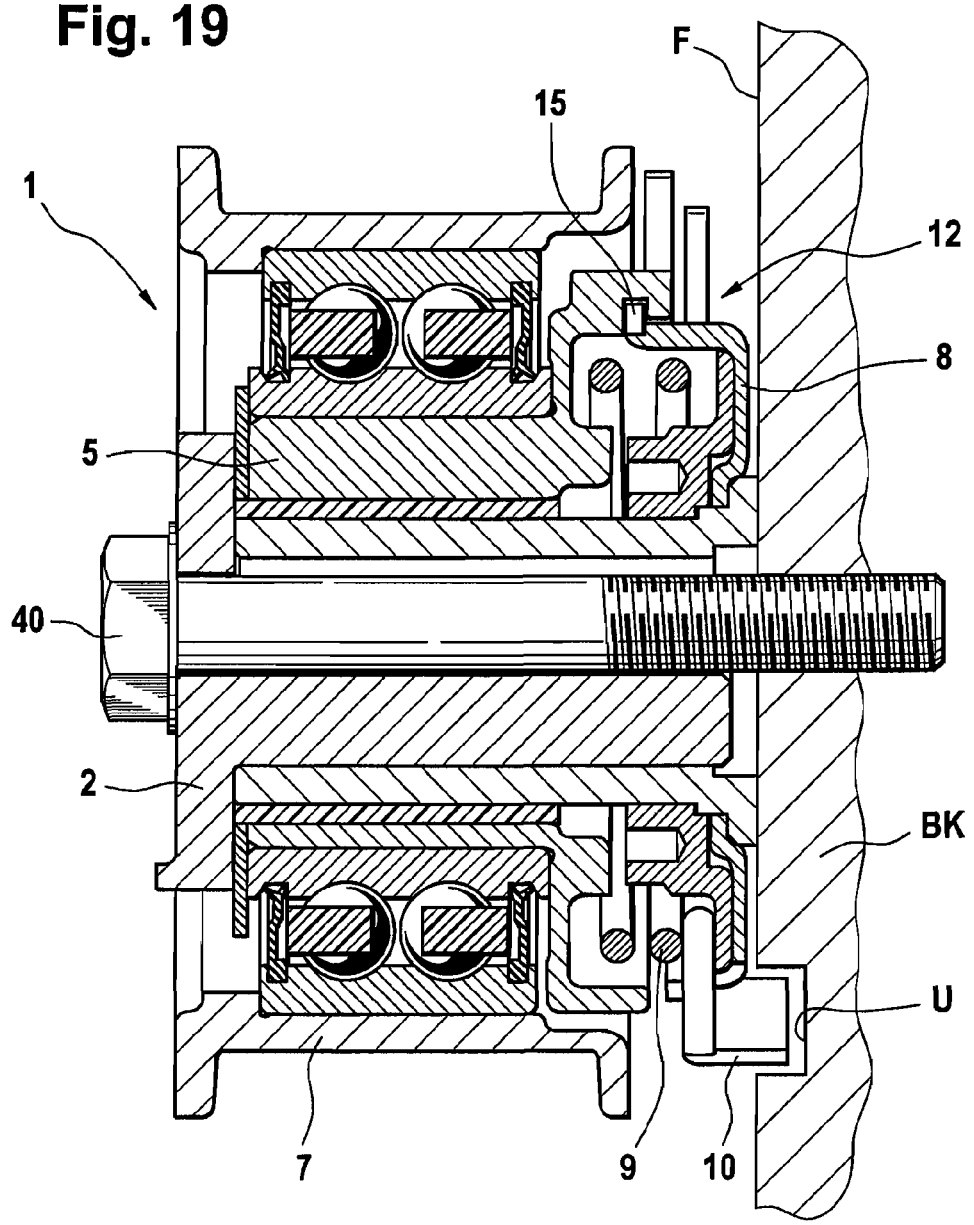
Figure 19:
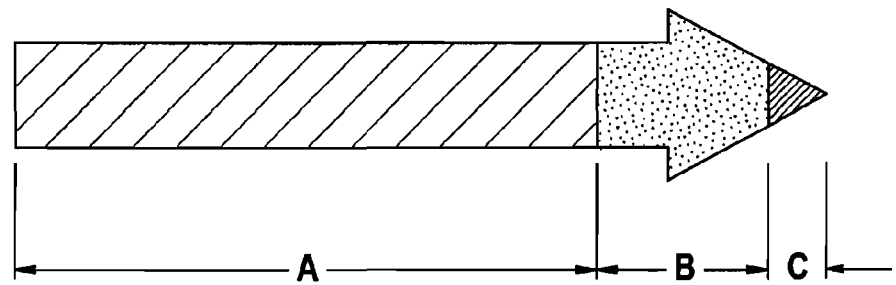

As shown in FIG. 19, the attachment of the eccentric tensioning device 1 on the flange surface F only indicated here for an internal combustion engine BK takes place by means of an attachment screw 40 in three steps. Within the scope of step A, the tensioning device is set without special pressing force on the flange surface F, so that the projection 10 of the base plate 8 is inserted into the indexing recess U provided on the side of the internal combustion engine. In this way, the peripheral position of the base plate 8 is fixed. Within the scope of step A, the attachment screw 40 is inserted into the adjustment eccentric 2.

Within the scope of the subsequent mounting step B, the attachment screw 40 is tightened until the screw head of the attachment screw 40 is seated lightly and without special axial force on the end of the adjustment eccentric 2. Within the scope of the attachment step B, the torsion spring 9 has not yet been loaded axially and thus the fixing device 12 has not yet been brought into a released position. After the attachment performed in this way for the tensioning device, the corresponding traction means can be inserted into the traction means drive of the internal combustion engine without using force.

After completion of the placement process of the traction means in the traction means drive, the final tightening of the tensioning device 1 on the flange surface F is performed. For this purpose, the attachment screw 40 is charged with an increased tightening moment within the scope of the attachment step C. Here, the work eccentric 5 is forced together with the adjustment eccentric 2 axially towards the base plate 8 until the base surface of the adjustment eccentric 2 sits on the flange surface F. During this phase C, the engagement element 15 formed on the base plate 8 emerges from a locking groove, as can be seen in this view, and thus releases the work eccentric 5. The work eccentric 5 now snaps into the tensioned position under the effect of the tensioning moment generated by the torsion spring 9 and in this way generates a transverse force applied to the traction means via the running disk 7.

Figure 20:
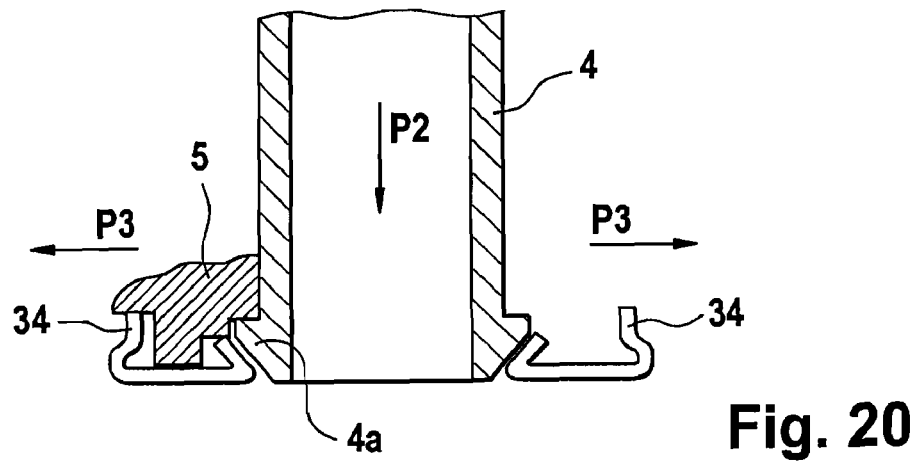

In FIG. 20, another variant of a fixing mechanism automatically guided into a released state within the scope of the mounting process of the tensioning device is shown. In this concept, the generation of the released state is realized through axial displacement of the slide bearing bushing 4. The slide bearing bushing 4 is here provided with a conical section 4*a*, which forces engagement claws 34 radially outwards for axial displacement indicated by the arrow symbol P2 and brings these out of the engagement position shown here with corresponding counter structures of the work eccentric 5. The displacement of the slide bearing bushing 4 in the way shown here can be realized especially in that this is pushed axially under the effect of the rim 20 of the adjustment eccentric 2.

Figure 21:
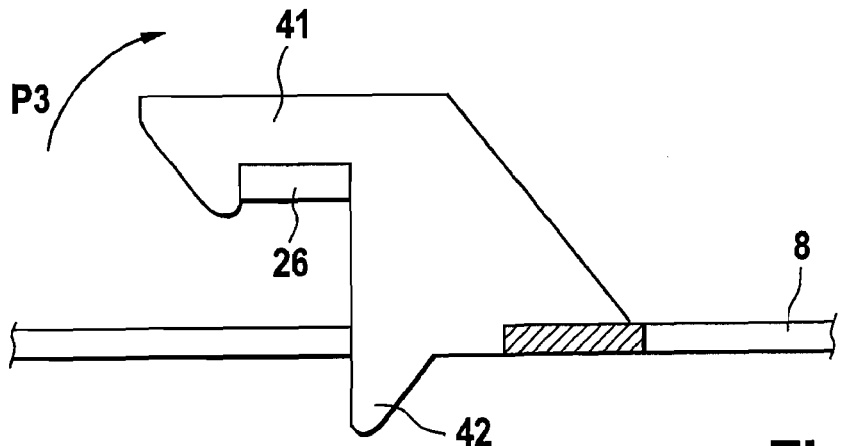

In FIG. 21, another variant of an automatically releasable fixing mechanism is shown. In this embodiment, the indexer 26 attached to the work eccentric is secured by a holding arm 41. This holding arm 41 is constructed in one piece with the base plate 8. When clamping the base plate 8 onto the flange surface F of the internal combustion engine, a projecting length 42 of the holding arm 41 is charged with a pressure force, so that the entire arm 41, as indicated by the arrow symbol P3, pivots upwards and thus releases the indexer 26.

Figure 22:
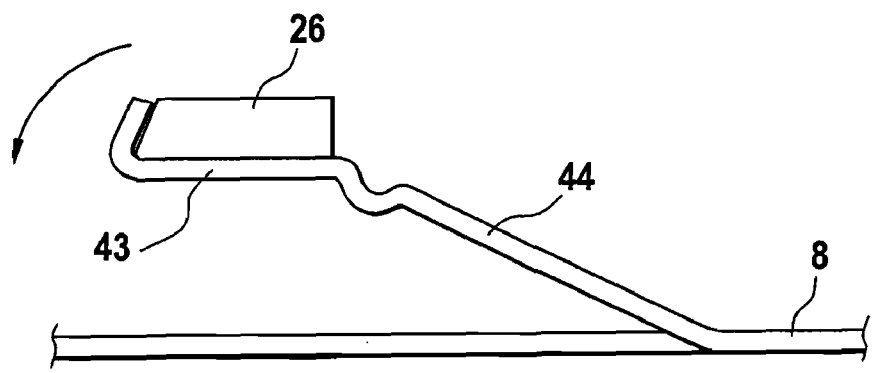

In FIG. 22, another variant of a fixing device is shown. The indexer 26 of the work eccentric 5 (not shown) is here secured by a hook section 43 of a spring elastic spring arm 44 pretensioned downwards. The release of the fixing mechanism shown in this way can be realized in that the work eccentric 5 is pivoted by a small angular amount against its pretensioning direction, so that the hook structure shown here comes free from the indexer 26 and the entire spring arm 44 can tilt downwards. It is also possible to provide structures, through which the spring arm 44 can be forced downwards and in this way comes free from the indexer section 26 within the scope of the last tightening phase of an attachment screw.

The rolling bearing of the tensioning device is preferably constructed as a radial rolling bearing, which is comprised of an inner bearing ring and an outer bearing ring, as well as a plurality of cylinder bodies rolling between the bearing rings in groove-shaped raceways and held relative to each other by a bearing cage at a constant distance and which has axially on both sides of its cylinder bodies a seal, with which the intermediate space constructed as a grease storage area between the bearing rings is sealed, wherein this rolling bearing is distinguished in that this is constructed as a ball roller bearing, whose cylinder bodies are each constructed with two parallel side surfaces symmetrically flattened from a basic ball shape. Relative to a comparable ball bearing, this ball rolling bearing offers an increased bearing capacity due to the higher number of cylinder bodies that can be mounted and due to the reduced installation space of the cylinder bodies together with an enlarged grease storage area. The cylinder bodies constructed as ball rollers are preferably shaped so that these preferably have a width between their side surfaces of approximately 70% of the diameter of their basic ball shape and can be inserted at first axially "flat" into the radial rolling bearing through a distance between the concentric bearing rings having a height of approximately 80% of the diameter of the basic ball shape of the cylinder body and can each be pivoted through a corresponding rotation by about 90° in the raceways of the bearing rings. The outer bearing ring here can form the running disk directly. The inner bearing ring can be formed directly by the work eccentric.

LIST OF REFERENCE NUMBERS

1 Tensioning device
2 Adjustment eccentric
3 Carrier body
4 Slide bearing
5 Work eccentric
6 Rolling bearing
7 Running disk
8 Base plate
9 Torsion spring
10 Projection
11 Indexer
12 Locking device
13 Section
14 Groove
15 Cam
16 Beginning of groove
17 Locking device
18 Projection
19 Projection
20 Inclined section
21 Recess
22 Groove
23 Rotating limiter
24 Rim
25 Recess
26 Indexer
27 Locking device
28 Sheet bracket
29 Locking device
30 Guide
31 Indexer
32 Receptacle
33 Pin

The invention claimed is:

1. Eccentric tensioning device for a traction means drive, comprising:
   a track roller device, which as such comprises a running disk and a rolling bearing provided for supporting the running disk,
   a work eccentric for supporting the track roller device, such that it can be displaced in a radial direction relative to a rotating axis of the rolling bearing according to a magnitude of pivoting of the work eccentric, the work eccentric being supported on an adjustment eccentric,
   a single torsion spring for pretensioning the work eccentric, supported at a first spring end by the work eccentric and supported at a second spring end by a base plate, and
   a fixing device for securing the work eccentric in a mounting position, in which the torsion spring is located in a pretensioned state, the fixing device including an axially extending projection connected to the base plate having a radially inwardly directed projection extending from an end thereof, and the work eccentric includes a recess or groove that corresponds to the radially inwardly directed projection in which the radially inwardly directed projection is engaged in an assembled pre-tensioned state of the tensioning device prior to installation,
   the fixing device is positionable on a flange surface upon which the eccentric tensioning device is mountable during attachment of the eccentric tensioning device, in which the running disk is forced radially relative to the rotating axis of the rolling bearing against the associated traction means under effect of the work eccentric, wherein a free switching path is traversed by moving the radially inwardly directed projection out of the recess or groove through an axial play being overcome during attachment of the eccentric tensioning device to the flange surface using an attachment screw, and the axial play (S) is overcome against an axial force applied solely by the torsion spring.

2. Eccentric tensioning device according to claim 1, wherein the adjustment eccentric is axially displaceable and a released state can be reached through axial displacement of the adjustment eccentric by the attachment screw.

3. Eccentric tensioning device according to claim 1, wherein the fixing device is automatically detachable through tightening of the attachment screw with which the eccentric tensioning device is connected to the flange surface carrying the eccentric tensioning device.

4. Eccentric tensioning device according to claim 1, wherein the torsion spring is constructed as a helical spring.

5. Eccentric tensioning device according to claim 1, wherein a damping device is provided for generating an eccentric braking moment counteracting a radial displacement of the track roller device.

6. Eccentric tensioning device according to claim 1, wherein the work eccentric comprises a plastic material.

7. Eccentric tensioning device according to claim 1, wherein the work eccentric is constructed in one piece with an inner ring of the rolling bearing.

8. Eccentric tensioning device according to claim 1, wherein the running disk is constructed in one piece with an outer ring of the rolling bearing.

9. Eccentric tensioning device according to claim 1, wherein the base plate includes an annular disk section, and the annular disk section is coupled locked in rotation with a carrier body in an area of an inner peripheral edge, and the axially extending projection is formed on the base plate in an outer edge region of the base plate.

10. Eccentric tensioning device according to claim 9, wherein a projection is formed on the base plate for rotationally locked anchoring of the base plate on the flange surface.

11. Eccentric tensioning device according to claim 10, wherein the projection is constructed so that the rotationally locked anchoring of the base plate on the flange surface is achieved before an axial release path is overcome.

12. Eccentric tensioning device according to claim 1, wherein securing means are provided, which prevent re-engagement of the fixing device.

13. Eccentric tensioning device according to claim 1, wherein the fixing device includes a guide formed on the base plate that receives an indexer arm of the work eccentric.

* * * * *